(12) United States Patent
Makino

(10) Patent No.: US 7,707,595 B2
(45) Date of Patent: Apr. 27, 2010

(54) DISK DRIVE EQUIPPED WITH MECHANISM FOR PREVENTING RATTLING OF TRAVERSE UNIT

(75) Inventor: Takeshi Makino, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 1216 days.

(21) Appl. No.: 11/260,288

(22) Filed: Oct. 28, 2005

(65) Prior Publication Data
US 2006/0095928 A1 May 4, 2006

(30) Foreign Application Priority Data
Oct. 29, 2004 (JP) ............................. 2004-315791

(51) Int. Cl.
*G11B 17/03* (2006.01)
(52) U.S. Cl. ..................... 720/601; 720/605; 720/612; 720/648; 720/651
(58) Field of Classification Search ................ 720/601, 720/605, 612, 648, 651, 698
See application file for complete search history.

(56) References Cited
U.S. PATENT DOCUMENTS
2003/0058780 A1 * 3/2003 Shirakawa ................. 369/263
2003/0076773 A1 * 4/2003 Moriyama et al. .......... 369/263

FOREIGN PATENT DOCUMENTS
JP 2000-311410 11/2000

* cited by examiner

*Primary Examiner*—Andrea L Wellington
*Assistant Examiner*—Carlos E Garcia
(74) *Attorney, Agent, or Firm*—Wenderoth, Lind & Ponack, L.L.P.

(57) ABSTRACT

To provide a disk drive capable of being prevented from rattling due to vibrations by a motor or eccentricity of a disk, support arms formed at both sides of a U-shaped traverse holder of a traverse unit have ribs protruding therefrom. Shaft portions protrude outward from front ends of the arms while bearing portions are provided on sidewalls of a chassis. The bearing portion has an axial hole formed in the side wall and a flexibly deformable, resilient arm extending forward spaced from the sidewall by a given distance, the axial hole having a front portion and a rear portion, the front portion being smaller in height than the rear portion, and the height of the front portion of the axial hole being slightly larger than outside diameter of the shaft portions. The shaft portions are fitted in the axial holes. The ribs are squeezed within the resilient arms.

5 Claims, 8 Drawing Sheets

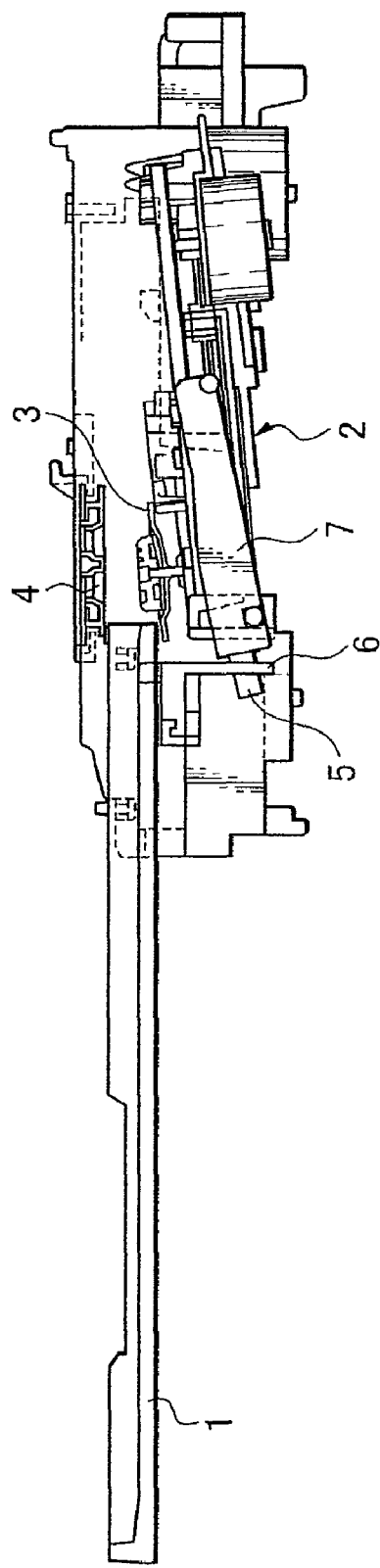
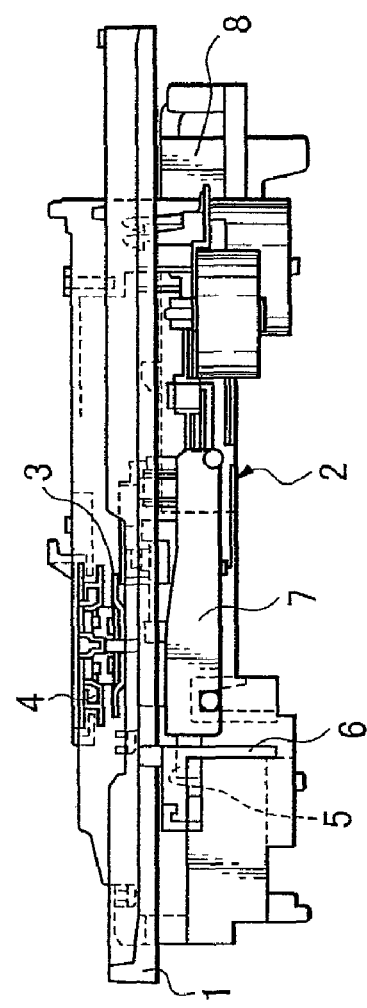
Fig. 8A PRIOR ART
Fig. 8B PRIOR ART

DISK DRIVE EQUIPPED WITH MECHANISM FOR PREVENTING RATTLING OF TRAVERSE UNIT

BACKGROUND OF THE INVENTION

1. Field of the Invention

The present invention relates to a disk drive equipped with a mechanism for preventing rattling of a traverse unit produced either by vibrations of a motor for rotationally driving a turntable or by unintentional movement caused by eccentricity of a disk.

2. Related Art

FIGS. 8A and 8B show a conventional disk drive equipped with a tray. A disk placed on the tray 1 is moved into a playback position as the disk is transported in, where a traverse unit 2 is elevated, and thus the disk is placed on a turntable 3 and damped. Conversely, when the disk should be taken out after playback, the traverse unit 2 is lowered to thereby move the disk placed on the turntable 3 onto the tray 1 and then the disk is carried out together with the tray.

When the tray 1 has been carried out, the traverse unit 2 has descended obliquely as shown in FIG. 8A. Accordingly, if a disk is placed on the tray 1 and carried into the disk drive, the traverse unit 2 ascends and the disk is placed on the turntable 3. Furthermore, the disk is squeezed within a damper 4 and clamped.

A protrusion 5 is formed in the center of the front side of a traverse holder 7 combined with the traverse unit 2 on the front-end side. The protrusion 5 is fitted in a cam groove formed in a rack-loading unit 6. When the rack loading unit 6 slides in the left and right direction, the front ends of the traverse holder 7 and traverse unit 2 ascend and descend about their rear ends.

The traverse unit 2 is mounted to a chassis 8 in this way and moves up and down about its rear end. The turntable 3, an optical pickup, and other components are mounted to the traverse unit 2. The traverse unit 2 is then mounted to the chassis 8. That is, the traverse unit 2 is tilted and inserted into the space formed in the chassis 8 to be stably supported to the chassis 8 by a holding mechanism. Furthermore, the traverse unit 2 is formed fundamentally free of rattling by the holding mechanism.

However, the turntable 3 is mounted to the traverse unit 2 and the disk fitted to the turntable 3 is rotationally driven at high speed by the motor. At this time, if the motor vibrates or the disk becomes eccentric, the traverse unit 2 concomitantly rattles. Consequently, there is the danger that playback and recording of the disk are hindered.

To guarantee secure disk loading in any attitude such as horizontal installation and vertical installation and to secure a disk rotation space with a sufficient eccentric margin, JP-A-2000-311410 discloses "Disk loading unit" in which a pair of centering members are arranged on both sides of a disk conveyance path opposite each other at an interval slightly exceeding the outside diameter of an optical disk. The centering members urge the optical disk carried in on a disk tray toward the center and guide the disk into a disk drive position. In this structure, a disk damping mechanism that operates after the optical disk has been carried into the disk drive position acts to damp the optical disk onto the turntable when the disk is in the disk drive position. On the other hand, a protrusion interlocking with damping operation of the disk damping mechanism expands the interval between the pair of centering members to form an eccentric space outside the optical disk brought to the damped state.

Accordingly, in either case the unit body is placed horizontally or vertically, the pair of centering members can damp the disk while reliably centering it, thereby enabling reliable loading. Furthermore, a sufficient permissible amount can be secured for displacement of the disk damping mechanism or its optical base, the damping mechanism being mounted into the unit via a vibration-damping means such as an insulator. The insulator itself can be made of a flexible member effective in absorbing vibrations. Consequently, when the disk is rotationally driven at high speed or a disk having an eccentric center of gravity is rotated at high speed, produced vibrations can be effectively dampened or cut off.

However, the centering members and insulator are used for centering of the disk by such disk loading unit as described above and for vibration-preventing means due to eccentric center of gravity of the disk. As a result, the structure is complicated and the fabrication cost is increased, since the number of components and the number of manufacturing steps are increased,

SUMMARY OF THE INVENTION

An object of the invention is to provide a disk drive capable of preventing rattling of a traverse unit with a quite simple structure, the rattling being caused either by vibrations of a motor or by vibrations produced by eccentricity of a disk.

A disk drive according to the present invention comprises a traverse unit including a traverse chassis to which a turntable, an optical pickup and other components are mounted, and a substantially U-shaped traverse holder having front-side portions squeezed within the traverse chassis; a resinous chassis accommodating said traverse unit; and a rack loading unit mounted over the chassis on front-end side of the traverse unit so as to be movable in a left and right direction; wherein the traverse holder is provided with support arms extending from both ends thereof, the support arms having plate-like ribs formed thereon respectively and shaft portions protruding outwardly from front ends thereof respectively, and the chassis is provided with bearing portions formed in side walls respectively, each of the bearing portions having an axial hole formed in the side wall and a flexibly deformable, resilient arm extending forward spaced from the sidewall by a given distance, the axial hole having a front portion and a rear portion, the front portion being smaller in height than the rear portion, and the height of the front portion of the axial hole being slightly larger than outside diameter of the shaft portions, whereby the shaft portions of said traverse holder are rotatably lifted in the axial holes formed in said bearing portions, respectively, and the plate-like ribs on the support arms are squeezed within and held by the resilient arms, thus preventing rattling of the traverse unit.

Each of the bearing portions may have a shaft portion support rib protruding inwardly from the side wall along the axial hole and a resilient arm standing upright from a base portion of the shaft portion support rib and extending forward at a given distance from the shaft portion support rib, whereby the plate-like rib of the support arm is held between said shaft portion support rib and the resilient arm.

A step portion may be formed on a top surface of the shaft portion support rib in a position opposite to a front end of the resilient arm. As a result, the support arms can be squeezed within and held by the resilient arms more reliably. A part of the sidewall of the chassis may have a two-layered structure consisting of outer and inner walls spaced from each other by a given distance, and the axial hole may be formed extending through the inner wall. Additionally, the chassis may have a vertical guide in which a protrusion formed in the center of the front surface of the traverse holder is loosely fitted to limit movement of the front end of the traverse holder in a left and right direction. In consequence, swinging of the front end of the traverse unit in the left and right direction is prevented. Hence, rattling in the left and right direction can be prevented more reliably.

According to the disk drive of the present invention, when the traverse unit has ascended and the disk is being played back, the plate-like ribs formed on the support arms of the traverse holder are held between the resilient arms formed near the bearing portions of the chassis, thus suppressing rattling of the traverse unit. Accordingly, if the motor driving the turntable vibrates or the eccentricity of the disk produces unintentional movement, the accuracy of reading the disk can be prevented from deteriorating. This rattling-preventing means is provided by a simple structure having only the resilient arms. In addition, the rattling-preventing means can be molded together with the chassis. Therefore, the fabrication is easy and the cost can be reduced.

BRIEF DESCRIPTION OF THE DRAWING

FIG. 8A is a side elevation showing a prior art disk drive in which the tray has been carried out; and FIG. 8B is a side elevation showing the prior art disk drive in which the tray has been carried in.

DETAILED DESCRIPTION OF PREFERRED EMBODIMENT

Figure 1:
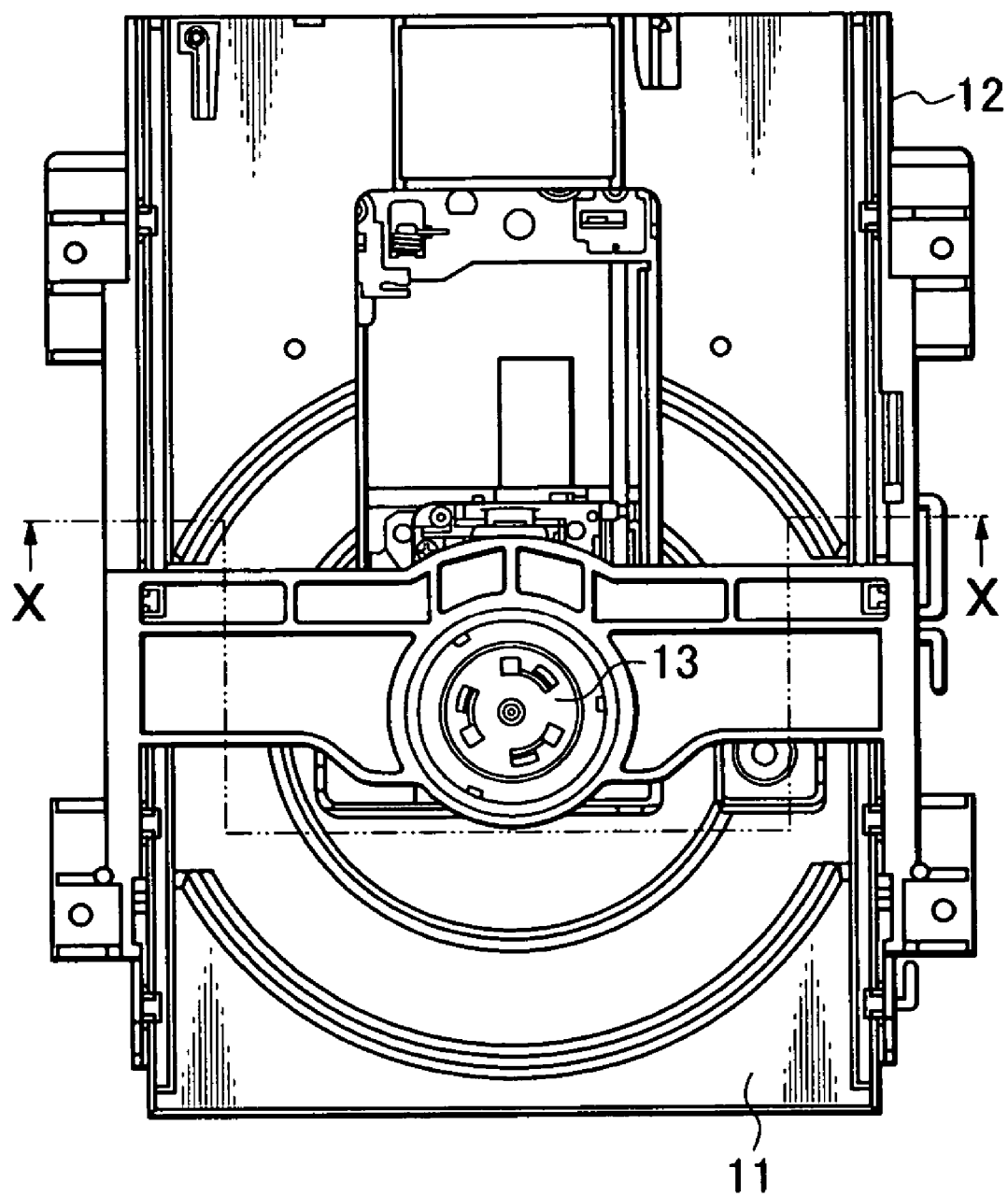
FIG. 1 is a plan view showing a disk drive according an embodiment of the invention.
Figure 2A:
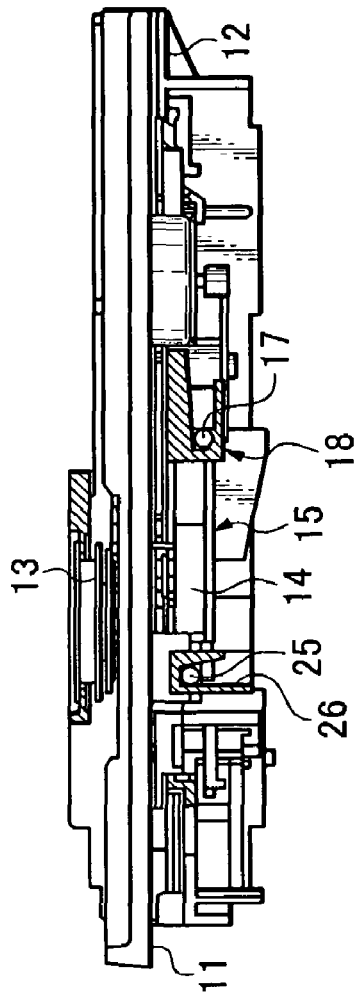
FIG. 2A is a side elevation partially in vertical cross section showing the disk drive in which a tray has been received.
Figure 2B:
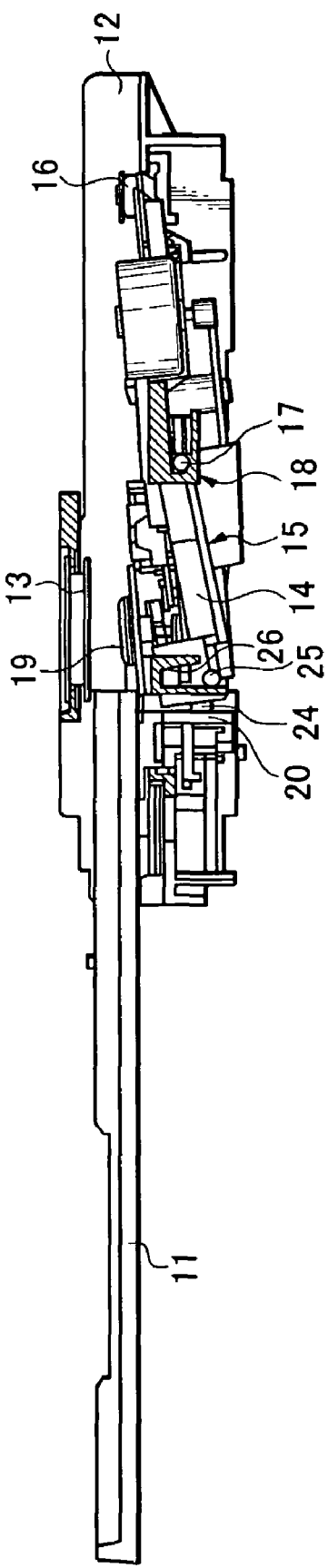
FIG. 2B is a side elevation partially in vertical cross section showing the disk drive in which the tray has been carried out.

FIG. 1 shows a disk drive according an embodiment of the present invention. The disk drive has a tray 11 that has been carried and received in a chassis 12. A damper 13 for damping a disk placed on a turntable 19 is equipped in the center of an upper portion of the chassis 12. As shown in FIGS. 2A and 2B, a traverse unit 15 is mounted to the chassis 12. A traverse holder 14 is equipped on the front-end side of the traverse unit 15. The turntable 19 is mounted on top of the traverse unit.

The rear end of the traverse unit 15 is supported to the chassis 12 via a resilient support member 16 made of rubber or the like. The front side of the traverse unit is connected to the traverse holder 14. This traverse holder 14 is shaped like the letter U and has shaft portions 17 mounted at the front ends of support arms extending from both ends of the holder 14. The shaft portions 17 are supported by bearing portions 18 provided on the chassis 12. A rack-loading unit 20 is provided on the chassis 12 and located on the front-end side of the traverse holder 14. The rack-loading unit 20 is movable in the left and right direction. The rack-loading unit 20 is provided with a staircase-like cam groove (not shown) in which a protrusion 24 formed in the center of the front end of the traverse holder 14 is slidably fitted. Accordingly, the front end of the traverse holder 14 moves up and down about the shaft portions 17 in an interlocking manner with the rack-loading unit 20. As the traverse holder 14 swings up and down in this way, the front end of the traverse unit 15 also moves up and down about the resilient support member 16.

Because of the structure described above, when the tray 11 is received in the chassis 12, the front end of the traverse unit 15 has ascended and the traverse unit 15 is placed horizontally as shown in FIG. 2A. When the tray 11 has been carried out, the traverse holder 14 has descended as shown in FIG. 2B. As a result, the front end of the traverse unit 15 has descended and the traverse unit 15 has tilted. Accordingly, if the tray 11 outside the drive is carried into the chassis 12, the traverse holder 14 ascends and the front end of the traverse unit 15 also ascends. The disk set in the tray 11 is placed on the elevated turntable 19. The disk is sandwiched between the turntable and the damper 13 mounted to the chassis 12 to be fixed.

Figure 3:
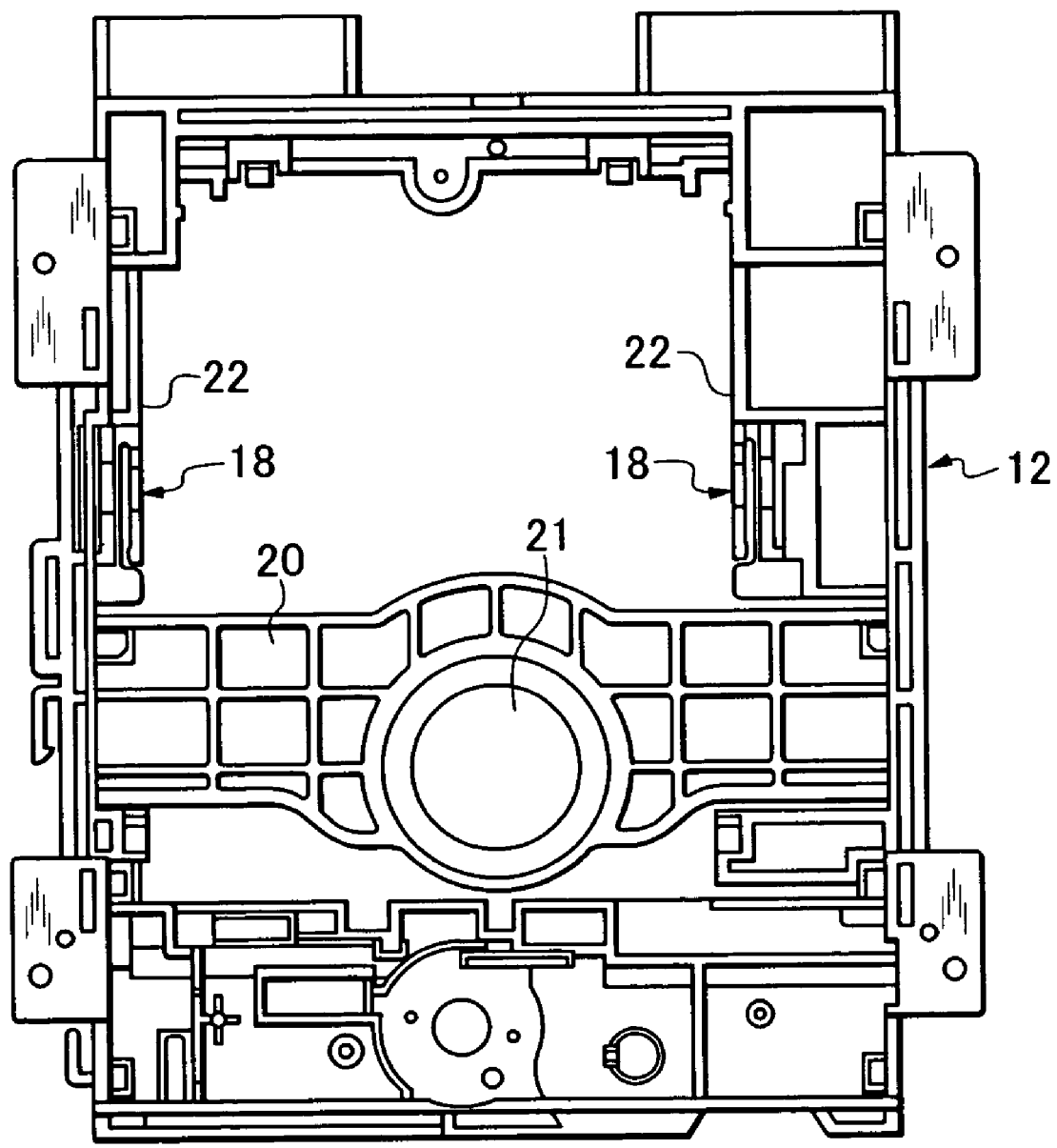
FIG. 3 is a plan view showing the chassis of the disk drive.

As shown in FIG. 3, the chassis 12 forms a box-like resinous frame body having both sidewalls 22. The chassis 12 has a damper support portion 21 bridging across the sidewalls 22. The damper support portion 21 is centrally provided with a hole 21a in which the damper 13 is mounted. The shaft portions 17 at the front ends of the support arms 27 of the traverse holder 14 are rotatably supported by the bearing portions 18 formed on the sidewalls 22 of the chassis 12, respectively.

Figure 4A:
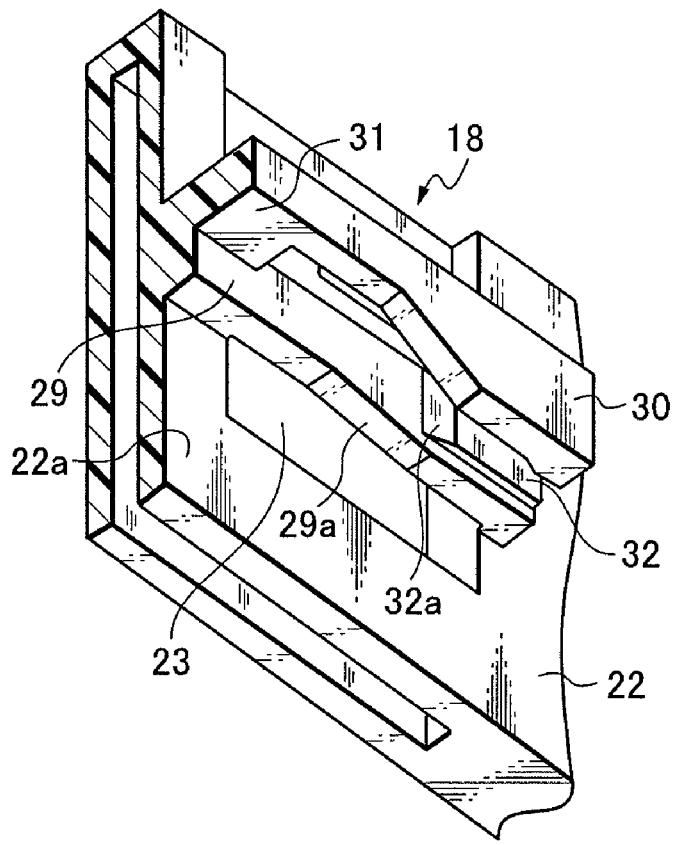
FIG. 4A is a perspective view showing a bearing portion mounted on one side wall of the chassis.

As shown in FIG. 4A, each of the bearing portions 18 comprises a rectangular axial hole 23 extending in the forward and rearward direction, an axial portion support rib 29, and a plate-like resilient arm 30. A part of each sidewall 22 of the chassis 12 is formed as a two-layered structure made of outer and inner walls spaced from each other by a given distance. The axial holes 23 of the bearing portions 18 are formed in the inner walls 22a of the two-layered structure. The support ribs 29 protrude inward from the inner walls 22a and bridge over the axial holes 23 in the forward and rearward direction. Each plate-like resilient arm 30 stands upright from the base portion of a respective one of the support ribs 29, is spaced from the rib 29 by a given distance, and extends forward. Each resilient arm 30 extends parallel to the support rib 29 from its base portion 31, is cantilevered from the base portion 31, and is formed so as to be flexibly deformable. A step portion 32 is formed on the inner surface of the shaft portion support rib 29 in a position opposite to the front-end portion of the resilient arm 30. The step portion 32 has a rear end having an inclined surface 32a. This narrows the space formed between them.

Figure 4B:
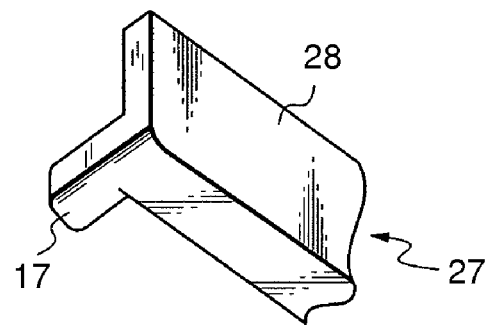
FIG. 4B is a perspective view showing a support arm front-end portion of a traverse holder.

As shown in FIG. 4B, a plate-like rib 28 and the shaft portions 17 protruding perpendicularly outwardly are formed at the front ends of the support arms 27 of the traverse holder 14. The shaft portions 17 can be inserted in the axial holes 23 formed in the bearing portions 18 as described above. The plate-like rib 28 is formed to a thickness to permit the rib to be held between the shaft portion support rib 29 and the resilient arm 30. That is, in order to mount the traverse holder 14 to the chassis 12, the shaft portions 17 of the traverse holder 14 are inserted into the axial holes 23 and the rib 28 is squeezed between the shaft portion support rib 29 and the resilient arm 30 (see FIGS. 5 and 7).

Figure 6A:
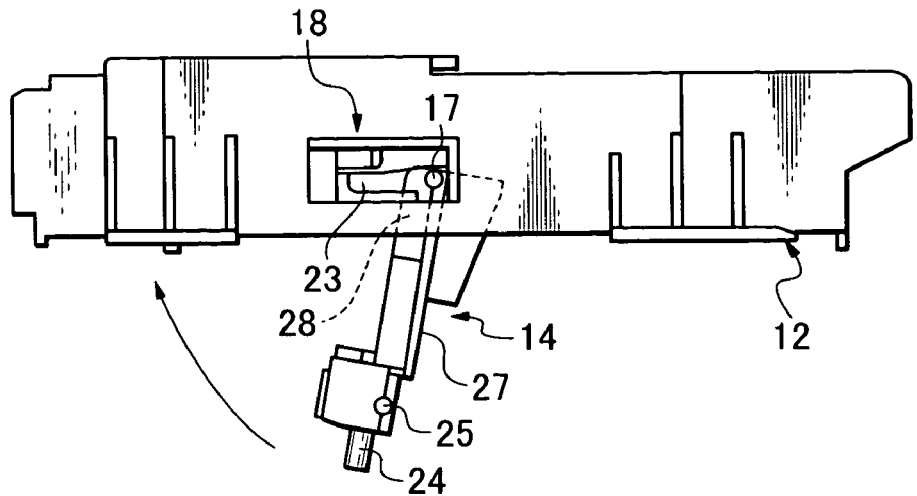
FIGS. 6A, 6B, and 6C are schematic side elevations of the traverse holder, showing a procedure by which the traverse holder is mounted to the chassis.
Figure 6B:
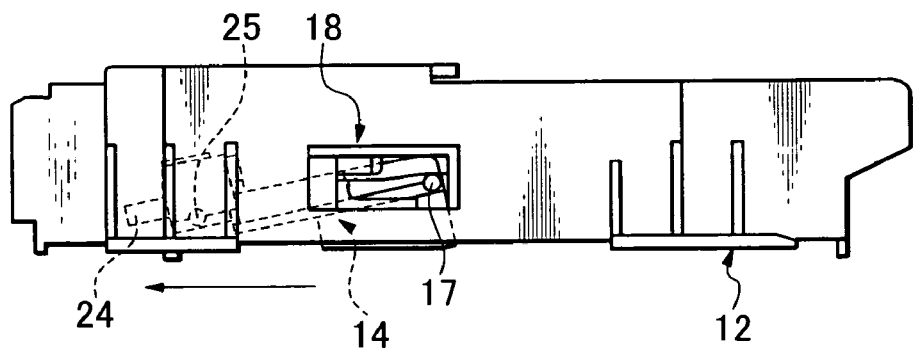
Figure 6C:
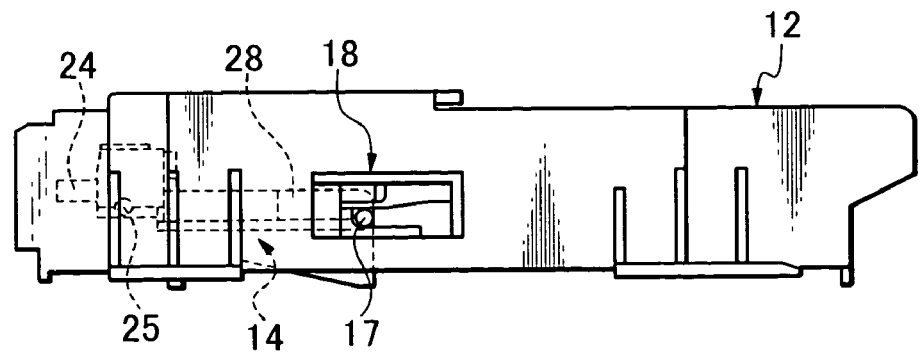

A procedure for mounting the traverse holder 14 to the chassis 12 is next described by referring to FIGS. 6A, 6B, and 6C. First, the shaft portions 17 at the front ends of the support arms 27 of the traverse holder 14 are inserted into the axial holes 23 in the bearing portions 18. Then, the front-end side of the traverse holder 14 is raised in the direction indicated by the arrow (FIG. 6A). When the protrusion 24 at the front end of the traverse holder 14 is raised to the front of the cam groove in the rack loading unit 20 (FIG. 6B), the traverse holder 14 is moved forward (in the direction of the arrow), causing the protrusion 24 to be fitted into the cam groove in the rack loading unit 20 (FIG. 6C).

The shaft portions 17 inserted in the axial holes 23 move toward the front ends at this time, so that their positions are limited. Consequently, rattling of the shaft portions in the up and down direction is prevented. That is, the side surface of the shaft portion support rib 29 is centrally provided with a tilted surface 29a ascending toward the front end. The axial holes 23 are so formed that the height of the front-end portions is made smaller but set slightly larger than the outside diameter of the shaft portions 17. Accordingly, the shaft portions 17 located at the front ends of the axial holes 23 are restricted in the up and down direction and thus, the shaft portions are placed in position tightly in the up and down direction. Furthermore, guide bosses 25 protrude outwardly from both sides of the base portion of the front side of the traverse holder 14. Since the guide bosses 25 are loosely fitted in guide grooves 26 (see FIG. 2), the traverse holder 14 is prevented from moving rearward at its elevated position.

Figure 5:
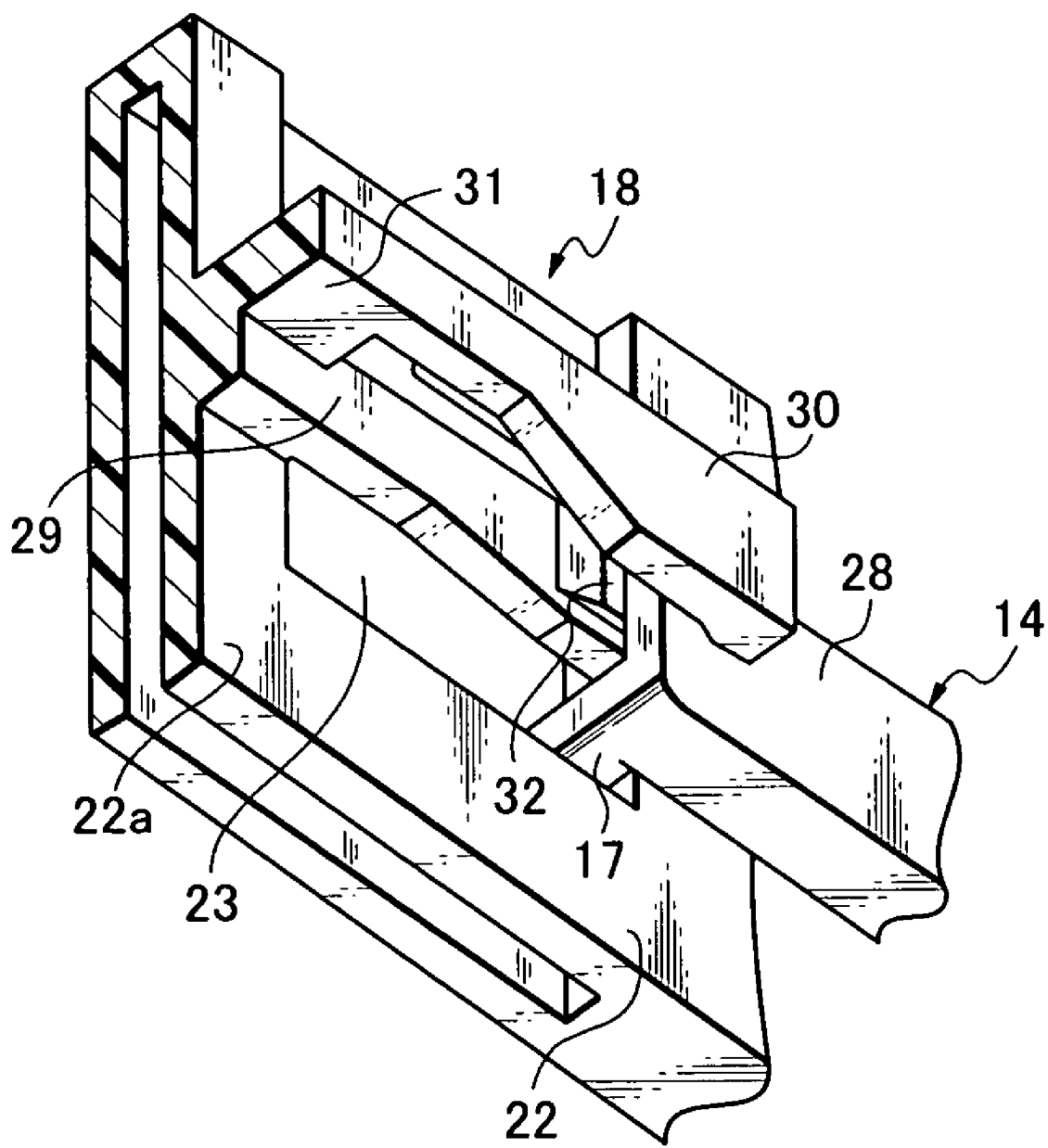
FIG. 5 is a perspective view of one shaft portion of the traverse holder showing the manner in which the shaft portion is mounted to the bearing portion.

On the other hand, the plate-like rib 28 is formed at the front end of the support arm 27 of the traverse holder 14 and sandwiched between the step portion 32 on the shaft portion support rib 29 and the resilient arm 30 as shown in FIG. 5. Thus, the left and right position of the traverse holder 14 is restricted, thus preventing rattling in the left and right direction. The biasing force of the resilient arm 30 holds the plate-like rib 28 between the arm and the step portion 32. This force holding the rib between the arm and step portion eliminates any gap among the rib 28, step portion 32, and resilient arm 30. Hence, rattling of the traverse holder 14 is prevented. Of course, up and down movement caused by movement of the rack loading unit in the left and right direction is not hindered.

Figure 7:
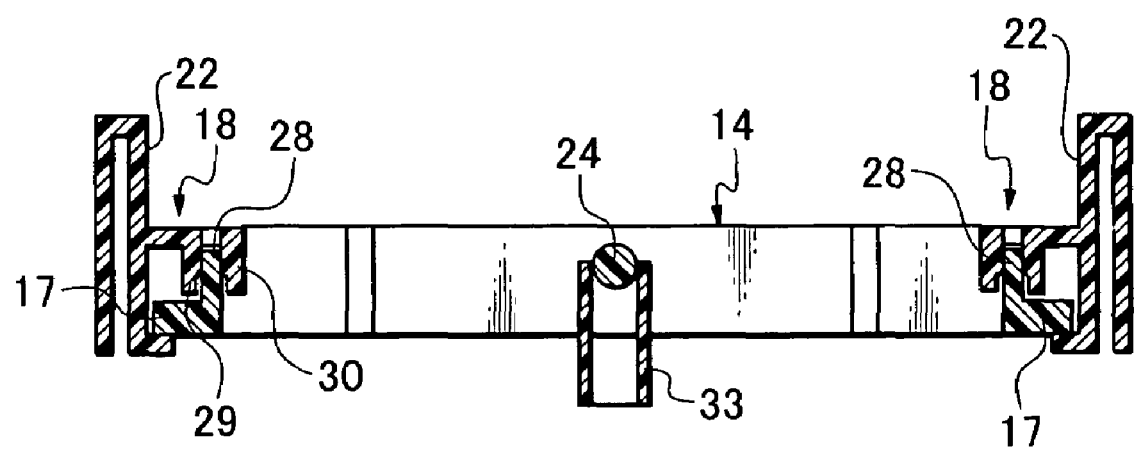
FIG. 7 is a cross-sectional view taken along line X-X of FIG. 1, showing the manner in which the traverse holder is mounted.

As shown in FIG. 7, the chassis 12 has a vertical guide 33 in which the protrusion 24 protruding to the center of the front of the traverse holder 14 is loosely fitted. This limits movement of the front end of the traverse holder 14 in the left and right direction. Rattling of the front end in the left and right direction is prevented when the rack-loading unit moves in the left and right direction to cause up and down movement of the traverse holder 14.

What is claimed is:

1. A disk drive comprising:
a traverse unit including a turntable, an optical pickup, other components, and a substantially U-shaped traverse holder;
a resinous chassis accommodating said traverse unit; and
a rack loading unit mounted over the chassis on a front-end side of the traverse unit so as to be movable in a left and right direction; wherein
the traverse holder is provided with support arms extending from both ends thereof, the support arms having plate-like ribs formed thereon respectively and shaft portions protruding outwardly from front ends thereof respectively,
the chassis is provided with bearing portions formed in sidewalls respectively, each of the bearing portions having an axial hole formed in the sidewall and a flexibly deformable, resilient arm extending forward, spaced from the sidewall by a given distance, the axial hole having a front portion and a rear portion, the front portion being smaller in height than the rear portion, and the height of the front portion of the axial hole being slightly larger than outside diameter of the shaft portions, and
the shaft portions of said traverse holder are rotatably fitted in the axial holes formed in said bearing portions, respectively, and the plate-like ribs on the support arms are squeezed within and held by the resilient arms, so as to prevent rattling of the traverse unit.

2. A disk drive according to claim 1, wherein
each of the bearing portions has a shaft portion support rib protruding inwardly from the sidewall along the axial hole and a resilient arm standing upright from a base portion of the shaft portion support rib and extending forward at a given distance from the shaft portion support rib, and
the plate-like rib of the support arm is held between said shaft portion support rib and the resilient arm.

3. A disk drive according to claim 2, wherein a step portion is formed on a top surface of the shaft portion support rib in a position opposite to a front end of the resilient arm.

4. A disk drive according to claim 1, wherein
a part of the sidewalls of the chassis have a two-layered structure comprising outer and inner walls spaced apart from each other by a given distance, and
the axial hole is formed extending through the inner walls.

5. A disk drive according to claim 1, wherein the chassis has a vertical guide in which a protrusion, formed in a center of a front surface of the traverse holder, is loosely fitted to limit movement of the front end of the traverse holder in a left and right direction.

* * * * *